Sept. 16, 1958　　　M. R. CONNER　　　2,852,129
CHAIN LINKAGE
Filed July 15, 1957　　　　　　　　　2 Sheets-Sheet 1

INVENTOR.
MICHAEL R. CONNER
BY
ATTORNEY.

Sept. 16, 1958     M. R. CONNER     2,852,129
CHAIN LINKAGE

Filed July 15, 1957                                                             2 Sheets-Sheet 2

INVENTOR.
MICHAEL R. CONNER
BY John D. Myers
ATTORNEY.

_United States Patent Office_

2,852,129
Patented Sept. 16, 1958

2,852,129

CHAIN LINKAGE

Michael R. Conner, Lithia Valley, Pa., assignor to Atlas Chain & Manufacturing Co., West Pittston, Pa., a corporation of Pennsylvania Application July 15, 1957, Serial No. 671,911

7 Claims. (Cl. 198—189)

This invention relates to the junction of links, as in a conveyer chain, particularly by means of a linking pin.

A well-known type of conveyer chain is made up of links having protruding curled knuckles and joined by linking pins extending within the knuckles of adjoining links. During operation, vibration and pivoting of the links tend to dislodge the pins, often "walking" them sideways until they either catch on adjoining stationary equipment or fall out completely, with attendant damage to the chain and any material being conveyed thereby. Headed pins increase the required clearance of the chain and are unwieldy to install, while pins with flush heads indented or swaged to retain them in place involve the likelihood of damage to the links, as well as insufficiently positive retention.

A primary object of the present invention is positive junction of chain links. An object is improved operation of linked chain conveyers. A particular object is provision of a captive linking pin for use in link chains. Other objects of the present invention, together with means and methods for attaining the various objects will be apparent from the following description and the accompanying diagrams.

Figure 1:
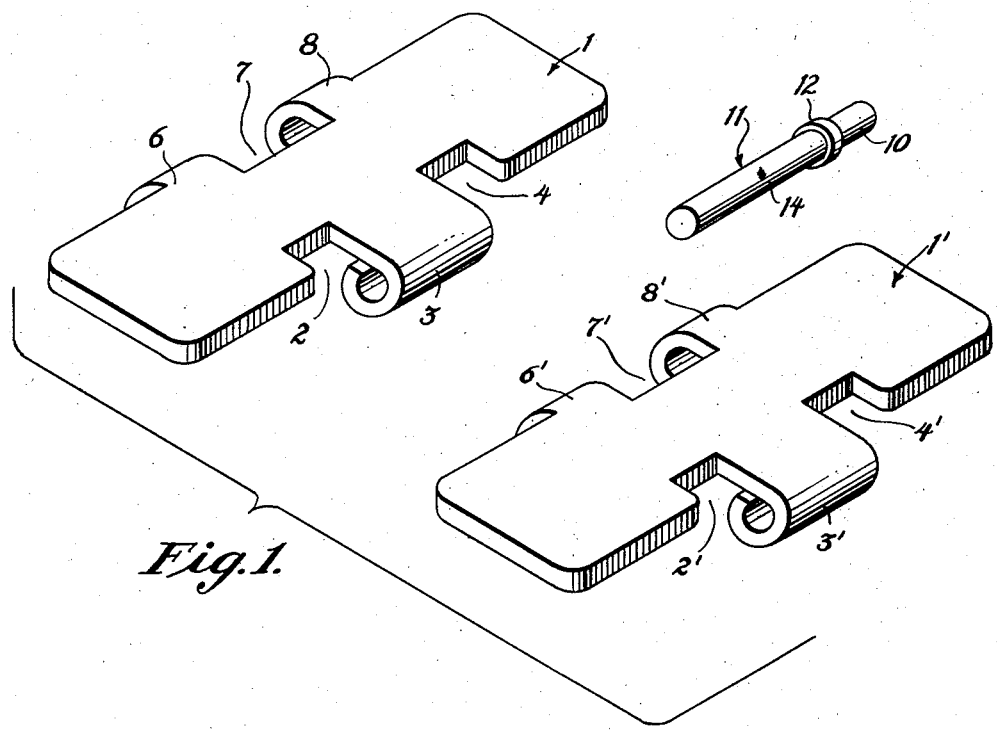
Figure 2:
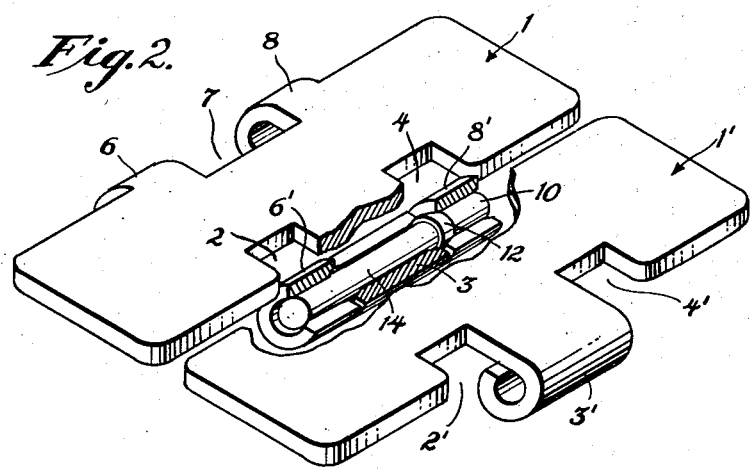
Figure 3:
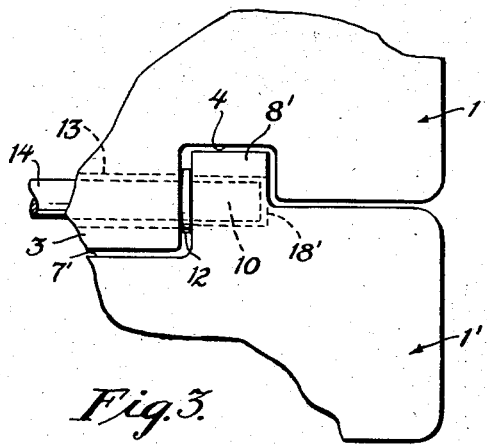
Figure 4:
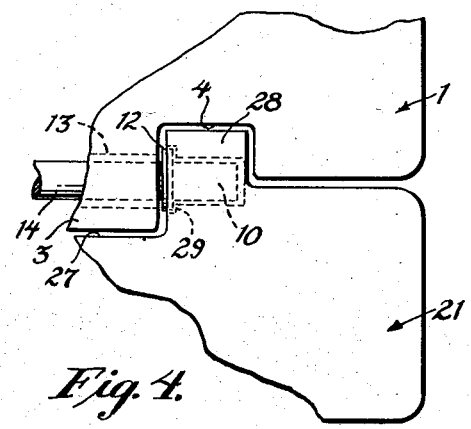
Figure 5:
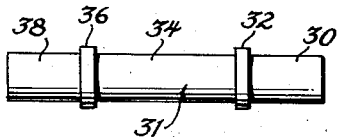
Figure 6:
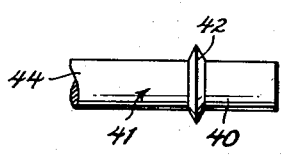
Figure 7:
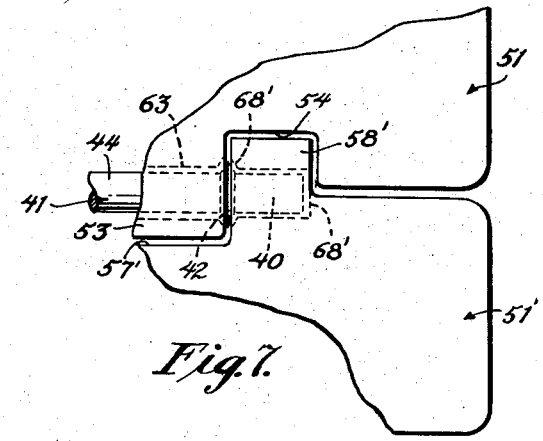
Figure 8:
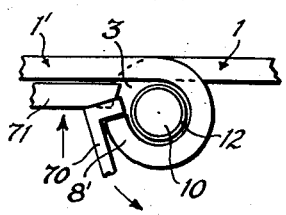
Figure 9:
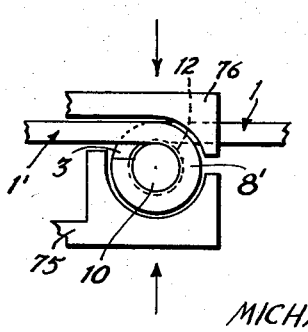

Fig. 1 is an exploded perspective view of two links and a linking pin of this invention, and Fig. 2 is a perspective of the links and pins of Fig. 1 as assembled. Fig. 3 is a plan of a portion of the assembled links and pin of Fig. 2, and Fig. 4 is a like plan of another embodiment of links and pin. Fig. 5 is a plan or transverse view of another embodiment of linking pin useful according to this invention; Fig. 6 is a like view of a major portion of yet another pin embodiment; and Fig. 7 is a plan view of links, differing somewhat from those previously shown, and joined by the pin of Fig. 6. Fig. 8 is an edge elevation of the links and pin of Fig. 1 at a stage in their assembly, and Fig. 9 is a like view of the closing of the near link of Fig. 8 on the pin.

In general, the objects of the present invention are accomplished, in a chain having a plurality of longitudinally aligned links with transversely aligned curled knuckles extending therefrom and joinable by pinning the knuckles together, by providing a linking pin having intermediate its ends a protruding portion exceeding in size the normal inside dimensions of the knuckles, the pin being located with its flanking portions extending within the knuckles of the respective links, and means extending from one of the links and adapted to cooperate with the other link to maintain the longitudinal alignment thereof, whereby the linking pin is held captive by the adjacent knuckles and in turn maintains them in sidewise alignment. The invention provides for assembling links of a chain by means of collared pins, particularly links of a kind characterized by a single curled knuckle extending from and substantially centered along one edge thereof and a pair of similarly curled knuckles extending from the opposite edge thereof and spaced from one another by more than the width of the first knuckle, by flanking the single knuckle of one link with the pair of knuckles of another link, with one of the knuckles in the pair expanded sufficiently to receive the collar of the pin, inserting such pin within the knuckles with the collar passing through the expanded knuckle, and then clamping the expanded knuckle onto the pin.

Fig. 1 shows in perspective two identical generally rectangular links 1 and 1', the first of which is described below in some detail and the second of which has like parts denoted by corresponding reference numerals primed to distinguish them from those of the first link. Link 1 has, midway of one long edge, wide knuckle 3 flanked by narrow recesses 2 and 4 and, from the opposite long edge, pair of knuckles 6 and 8 spaced from one another by wide recess 7 located midway of that edge. Each knuckle curls arcuately out and down from the body of the link and back up to terminate at the underside thereof, thereby circumscribing a cylindrical bore (reference numerals for which exceed by ten the reference numerals for the corresponding knuckles). The respective recesses are somewhat longer and wider or deeper than the corresponding links so that two or more of these links can be assembled in chain form.

Also shown in Fig. 1 is generally cylindrical linking pin 11 having short and long cylindrical portions 10 and 14, respectively, of like diameter separated by collar 12. The collar has a flat peripheral surface of constant radius, with perpendicular sidewalls. The collar diameter is appreciably greater than the inside diameter or bore width of the knuckles, while in diameter the long and short cylindrical portions of the pin are slightly smaller than the knuckle bore. The short cylindrical portion of the pin is no longer than the bore of one of the narrow knuckles, and the long cylindrical portion approaches the combined lengths of the wide knuckle and one of the narrow knuckles.

Fig. 2 shows in assembled form the same elements illustrated in exploded form in Fig. 1. Wide knuckle 3 of Fig. 1 is flanked by narrow knuckles 6' and 8' of link 1', the respective knuckles fitting into the corresponding recesses of the opposing link. The pin is in place within these three aligned knuckles (portions of which are broken away to reveal it) with its collar located between the wide knuckle of the first link and the righthand narrow knuckle (8') of the second link, as shown more clearly in Fig. 3.

Fig. 3 shows in plan the righthand portions of both links and pin of the preceding views. Long cylindrical portion 14 of the pin is held rotatably within the bore 13 of wide knuckle 3 of the first link, and short cylindrical portion 10 is held (either rotatably or more tightly) within the bore 18' of righthand narrow knuckle 8' of the second link, with collar 12 retained in between. The width of recess 4 is ample to accommodate the collar as well as knuckle 8'. It is apparent from this view that the lefthand knuckle (6) of the second link cooperates to keep the links in longitudinal alignment, while the pin through the knuckles maintains the transverse alignment of the knuckles, and the collar prevents the pin from working sidewise and catching or escaping as conventional pins are wont to do. Insertion of the pin is described hereinafter.

In some uses of conveyer chains so comprised, the separation of the knuckles by the width of the collar may be undesirable, and Fig. 4 illustrates in plan the same first link and pin as before but with a modified cooperating link that eliminates such separation. Link 21 receives in recess 27 wide knuckle 3 of the first link, and narrow knuckle 28 of link 21 fits into recess 4 of the first link and has shouldered bore 29 whose enlarged part receives the collar of the pin, thereby permitting the adjacent edges of the respective knuckles to approach as closely as desired. It is apparent that the bore of the wide link could be recessed instead, or in addition, to receive all or part of the collar.

Fig. 5 shows a double-shouldered pin useful in like manner. Pin 31 has center cylindrical portion 34 flanked by pair of collars 32 and 36 and right and left end portions 30 and 38, also cylindrical. When in place to join links of the types already described, each collar of this pin fits between the wide knuckle and one of the adjacent narrow knuckles or within the bore of either (or both) recessed to receive it, as is apparent from Figs. 3 and 4 devoted to the single-collared pin, inasmuch as the resulting double-collared configuration is symmetrical about a median plane.

Fig. 6 depicts another form of linking pin useful according to this invention. Pin 41 has collar 42, which (instead of having sides parallel to one another and perpendicular to flanking cylindrical portions 40 and 44 of the pin) has sloping or tapered sides that meet in a peripheral peak or ridge. Only one collar is shown, the lefthand portion of the pin being cut off, but obviously the illustrated collar may be duplicated on the left side, if desired, after the manner of the double-collared pin of Fig. 5, just described.

Fig. 7 shows in plan links 51 and 51' joined by pin 41, each of these links resembling links 1 and 1' in every respect except that bore 63 of the wide knuckle (which surrounds long cylindrical portion 44 of the pin) and bore 68' of the illustrated adjacent knuckle (which surrounds short cylindrical portion 40) are countersunk to accommodate the collar. The remaining parts of these links are identical with those of the links first illustrated (and are identified by reference numerals exceeding by fifty the numerals employed there).

Insertion of the pins to join the links is accomplished readily, as will be apparent, by assembling the links with the pair of narrow knuckles of each flanking the wide knuckle of the next and by increasing the bore of one or more of the knuckles in each aligned set, if necessary, sufficiently to insert the collared pin until it is centered from side to side of the links, and finally reducing the bore to retain the pin. The links are produced and their knuckles curled as is well known in the art, being made customarily of steel. Any knuckle may be left open enough to permit passage of a pin collar and then be closed, or it may be closed completely and then be sprung or otherwise opened so as to admit such a collar and finally be reclosed.

For example, in joining the links of Fig. 1 by the pin of the same view to provide the assembled relationship illustrated in Figs. 2 and 3, long cylindrical end of the pin is passed conveniently through righthand knuckle 8' of the second link and then within aligned wide knuckle 3 of the first link. As shown in Fig. 8, the narrow knuckle may be opened partially by L-shaped pry bar 70 which grasps the end of the knuckle and moves downward (in the direction of the arrow) from the body of the link, which itself is supported by restraining plate 71 (with arrow indicating application of the supporting force). Knuckle 8' is shown opened just enough to exceed the diameter of collar 12. A part of wide knuckle 3 of the other link is visible in the resulting gap; of course, with a single-collared pin, there is no necessity to pass the collar through that knuckle as well.

Fig. 9 shows the previously opened knuckle reclosed by clamps 75 and 76, which can be actuated in any suitable manner in the directions indicated by the arrows. Clamp 75, which has a substantially semi-cylindrical concave surface, moves upward toward the bottom of the link, as clamp 76, which has a shorter arcuate concave surface terminating in a flat surface fitting on top of the link, moves downward. Alternatively, the pin with a tapered collar may be driven into place, itself forcing the knuckle open; with adequate flexibility in the material of the link thus expanded, the knuckle may spring shut when the pin reaches the desired location, or it may be clamped in manner like or equivalent to that just described. Of course, when a double-collared pin is employed, the wide knuckle may be treated likewise.

The linking pin fits rotatably in the knuckles of one or both links joined by it so as not to inhibit flexibility of the chain so constructed. When the linking pin fits rotatably in all the knuckles through which it extends, the pin is free to rotate on its longitudinal axis, thus presenting increased bearing surface and enhancing chain life through improved distribution of bearing wear. For some applications, however, it may be desirable to have a tight fit of the pin in the narrow knuckles. In either event, the degree of tightness or fit may be controlled by adjustment of the opening (if any) and closing forces applied to the knuckles, with due regard to the materials of construction and treatment of the links, as will be apparent to those skilled in the art. The configuration of the links may be altered without a departure from the inventive concept whose embodiment is disclosed here; for example, additional knuckles may be provided on the links as in well-known forms of hinges. The advantages and benefits of the present invention will become fully apparent to those undertaking to practice it.

The claimed invention:

1. In a chain having aligned links with curled knuckles extending therefrom and joined by pins through the knuckles, the combination of a pair of links aligned longitudinally with one another and having curled knuckles extending in sidewise alignment with one another, a linking pin having intermediate its ends a protruding portion exceeding in size the normal inside dimensions of the knuckles, the pin being located with its flanking portions extending within the knuckles of the respective links, and means extending from one of the links and adapted to cooperate with the other link to maintain the longitudinal alignment thereof, whereby the linking pin is held captive by the adjacent knuckles and in turn maintains them in sidewise alignment.

2. The apparatus of claim 1, in which the pin is cylindrical, and the protruding portion forms a collar therefor.

3. The apparatus of claim 1, in which the longitudinally aligning means is another curled knuckle adapted to receive an end of the linking pin.

4. In a link chain, the improvement comprising a first link having a curled knuckle extending from and substantially centered along an edge thereof, a second link having a pair of curled knuckles extending from an edge thereof and spaced from one another by more than the width of the first knuckle, and a generally cylindrical linking pin having at least one collar portion larger than the inside diameter of the knuckles and flanking portions adapted to extend within the knuckles with the collar portion located between and retained by the knuckle of the first link and one of the pair of knuckles of the second link.

5. A chain composed of a multiplicity of the links and pins of claim 4, each link being substantially identical to the others and having both a centered curled knuckle along one edge and, along the opposite edge, a pair of spaced curled knuckles.

6. The links and pin of claim 4 characterized further in that the linking pin is freely rotatable within the centered knuckle but fits tightly within the cooperating spaced pair of knuckles.

7. The links and pin of claim 4, characterized further in that the linking pin is freely rotatable within all the knuckles through which it extends.

References Cited in the file of this patent

UNITED STATES PATENTS

| | | |
|---|---|---|
| 1,160,057 | Ensign | Nov. 9, 1915 |
| 2,660,292 | Cheesman | Nov. 24, 1953 |
| 2,665,547 | Soderlund | Jan. 12, 1954 |
| 2,729,935 | Beck | Jan. 10, 1956 |

FOREIGN PATENTS

| | | |
|---|---|---|
| 716,246 | Germany | Jan. 15, 1942 |